United States Patent
Seibold et al.

(10) Patent No.: US 6,170,913 B1
(45) Date of Patent: Jan. 9, 2001

(54) BACK FRAME LOCKOUT VIA CUSHION

(75) Inventors: Kurt A. Seibold, Dearborn Heights; Mark A. Pattok, Allegan, both of MI (US)

(73) Assignee: Johnson Control Technology Company, Plymouth, MI (US)

( * ) Notice: Under 35 U.S.C. 154(b), the term of this patent shall be extended for 0 days.

(21) Appl. No.: 09/457,404

(22) Filed: Dec. 8, 1999

(51) Int. Cl.⁷ ............................................... B60N 2/00
(52) U.S. Cl. ...................... 297/335; 297/378.12; 297/316
(58) Field of Search .................... 297/335, 336, 297/483, 378.12, 378.1, 340, 316, 324

(56) References Cited

U.S. PATENT DOCUMENTS

| | | |
|---|---|---|
| 4,627,656 * | 12/1986 | Gokimoto et al. . |
| 5,133,589 | 7/1992 | Kimura . |
| 5,383,699 * | 1/1995 | Woziekonski et al. . |
| 5,466,048 | 11/1995 | Fowler et al. . |
| 5,577,805 * | 11/1996 | Glinter et al. . |
| 5,641,202 | 6/1997 | Rus . |
| 5,762,401 * | 6/1998 | Bernard . |

* cited by examiner

Primary Examiner—Milton Nelson, Jr.
(74) Attorney, Agent, or Firm—Foley & Lardner

(57) ABSTRACT

A latching mechanism for use with a seat assembly having a separately movable seat cushion and seat back, the latching mechanism including a base member, a sector support for supporting the seat back and a lever. The sector support is pivotally coupled to the base member and includes an engagement surface. The lever is pivotably coupled to the base member, and includes a stop. As the seat cushion is moved to a seat forming position, the seat cushion will actuate the lever, the lever placing the stop into contact with the engagement surface and preventing the movement of the seat back.

22 Claims, 3 Drawing Sheets

BACK FRAME LOCKOUT VIA CUSHION

BACKGROUND OF THE INVENTION

The present invention relates to a seat assembly having a seat cushion and seat back which can be moved from a stowed position to a use or seat forming position. More specifically, the present invention relates to a seat cushion activated latch mechanism which latches the seat back into a use position.

Many vehicles such as sport utility vehicles and minivans are provided with sophisticated seat assemblies that may be folded or collapsed when moved to a stowed position from a seat forming position. This variability in position is created by a system of pivots and support members coupled to the vehicle. In one such embodiment, the seat cushion portion of the seat assembly is hinged relative to the floor adjacent to its forward edge so that it pivots forward to a vertical stowed position. In a similar manner, the seat back is hinged relative to the floor of the vehicle so that it may fold forward to a horizontal stowed position next to the seat cushion, thus forming a flat cargo receiving surface with its back side.

When in a seat forming position, it is important that the seat assembly be properly secured in position to insure that the seat cushion and seat back will not move during the normal operation of the vehicle. In applications where an integral or three point restraint seat belt is located in the seat back of a seat assembly, it is particularly important that the seat back is properly latched into position. Accordingly, it is an object of the present invention to provide a seat assembly, and in particular a seat back, that can be automatically latched to a secured position after the seat cushion and the seat back have been placed in a seat forming position.

SUMMARY OF THE INVENTION

In accordance with the present invention, a vehicle seat assembly is provided with a latch mechanism for latching and unlatching the seat assembly in a use or seat forming position. The seat assembly in the preferred embodiment includes a pivotable seat cushion and a pivotable seat back. A first pivoting mechanism supports the seat cushion and allows the seat cushion to be pivoted between a generally horizontal use position and a generally vertical stowed position. A second pivoting mechanism, which includes the latch mechanism, supports the seat back and allows the seat back to be moved between a generally vertical use position and a generally horizontal stowed position, overlying the horizontal use position of the seat cushion. The latch mechanism automatically unlatches the seat back in response to movement of the seat cushion from its seat forming position, and automatically latches the seat back in response to movement of the seat cushion to its seat forming position. The latch mechanism of the present invention may also be used with other various seat storage and movement assemblies such as four bar linkages and a floating seat cushion using a two bar linkage, but is not limited to Such.

The latch mechanism of the present invention includes a sector support, a base member attached to the vehicle floor, and a seat cushion actuated lever. The seat back in the preferred embodiment is coupled to the sector support which is further pivotably coupled to the base member. The lever is also pivotably coupled to the base member and is pivoted by contacting the bottom of the seat cushion as the seat cushion moves between a stowed position and a seat forming position. The lever includes a stop that is rotated by the pivoting action of the lever. The sector support includes an engagement surface which has been designed to mate with the stop on the lever. When the seat cushion is moved into the seat forming position, the lever will move the stop into a position where it is able to contact the engagement surface of the sector support and latch the seat back into the seat forming position. Accordingly, the steps of manually latching and unlatching the seat back to a seat forming position are eliminated. This eases the operation and manipulation of the seat assembly.

Furthermore, the engagement surface of the sector support has been configured with a profiled engagement surface. The profiled engagement surface has been shaped to mate with the stop positioned on the lever to create a snug or firm fit. This snug fit will minimize unwanted movement of the seat back during operation and the associated rattle, improving the over all quality and feel of the seat assembly.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT

The following description of the present invention is merely exemplary in nature and is in no way intended to limit the invention or its uses. Moreover, the following description, while depicting a latch mechanism designed to operate with bench seats having a flip forward or translatable seat cushion and a seat back, is intended to adequately teach one skilled in the art to make and use the latch mechanism of the present invention with any type of seat system to which it may be adapted.

Figure 1:
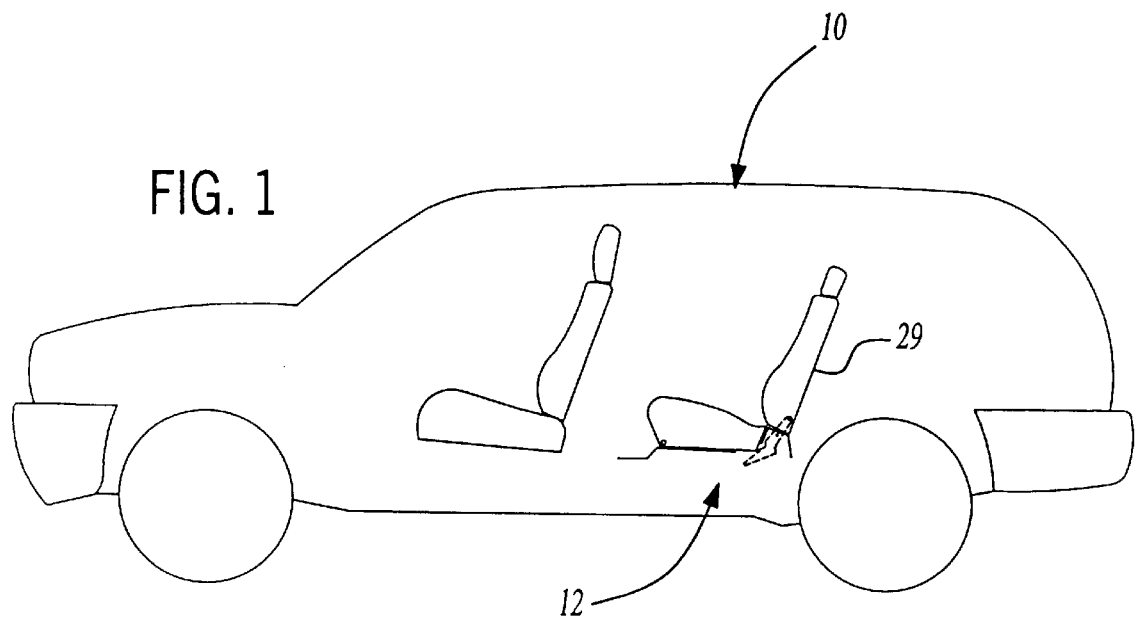
FIG. 1 is an elevational view of a vehicle incorporating the seat assembly according to the preferred embodiment of the present invention.
Figure 2:
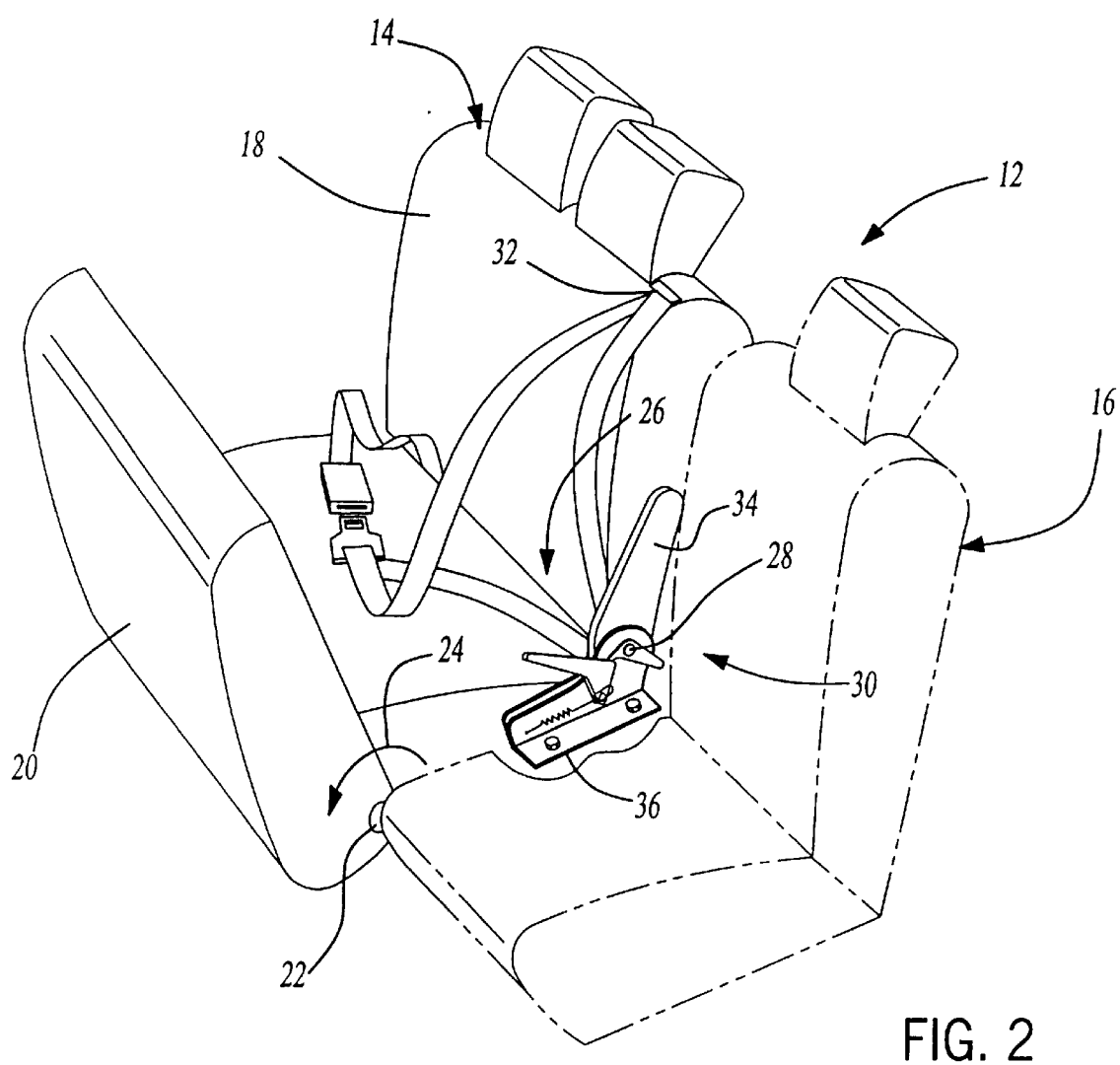
FIG. 2 is a perspective view of the seat assembly shown in FIG. 1 according to the preferred embodiment of the present invention showing the seat cushion and seat back in their respective seat forming and stowed positions.

Referring to FIGS. 1 and 2, a vehicle 10 of the sport utility type is shown with a rear split bench seat assembly 12. The bench seat assembly 12 in the preferred embodiment is split into a section 14 which provides generally sixty percent of the seating area ("the sixty section"), and a section 16 which provides generally forty percent of the seating area ("the forty section"). The sixty section 14 includes a seat back 18 and a seat cushion 20. The seat cushion 20 may be pivoted or flipped forward about pivot point 22 in the direction of arrow 24 to a vertical stored position. The seat back 18 may be pivoted in the direction of arrow 26 downward about pivot point 28 to a horizontal stored position where the rear surface 29 of the seat back 18 is used as a cargo surface. The seat back 18 further includes an integral seat belt such as a three point restraint 32. In alternate embodiments of the present invention, as discussed previously, the seat assembly may include a seat cushion that is movable by, as nonlimiting examples, using a four bar linkage, a two bar linkage, or similar devices allowing translation. Moreover, the seat assembly may be used in any type of vehicle as well.

Figure 3:
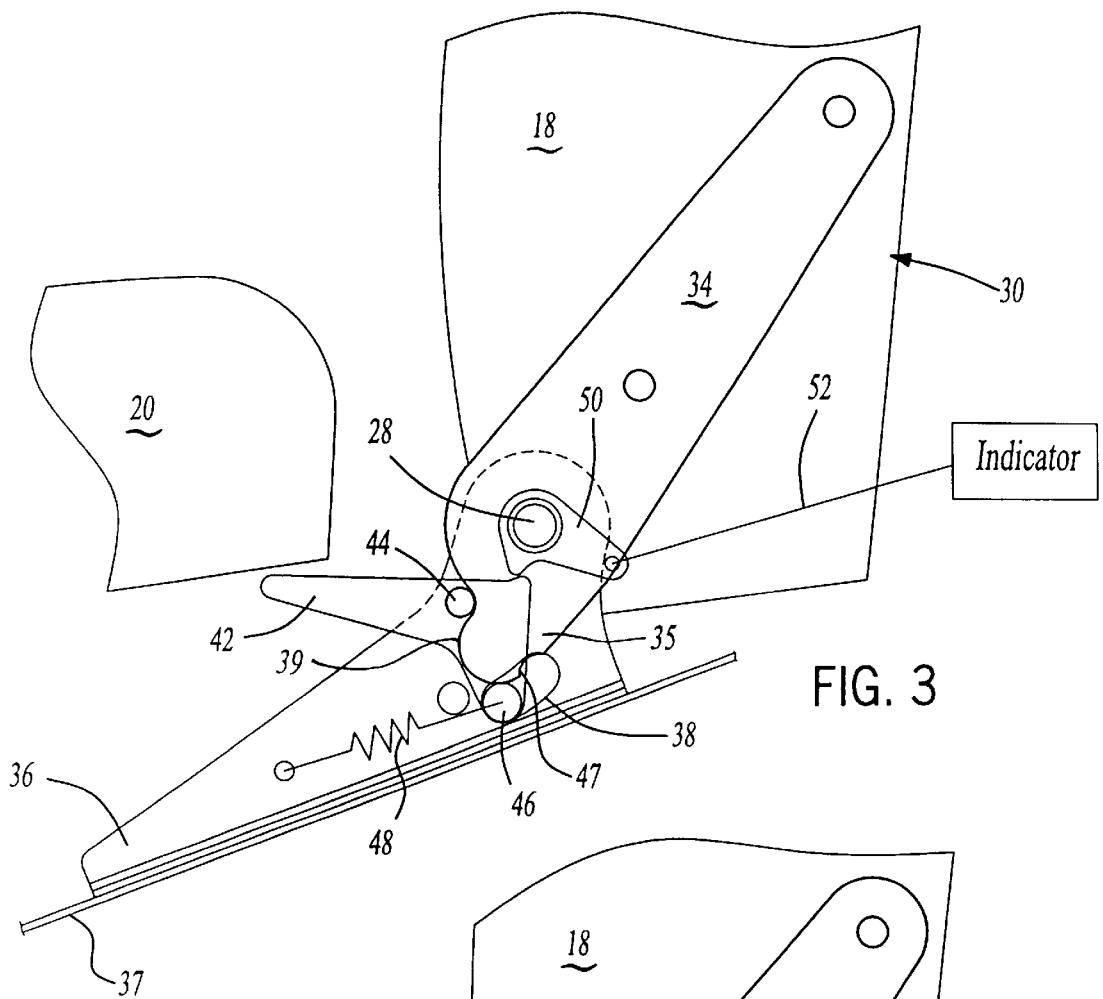
FIG. 3 is an enlarged view of the latch mechanism shown in FIG. 1 according to the preferred embodiment of the present invention shown in an unlatched position.
Figure 4:
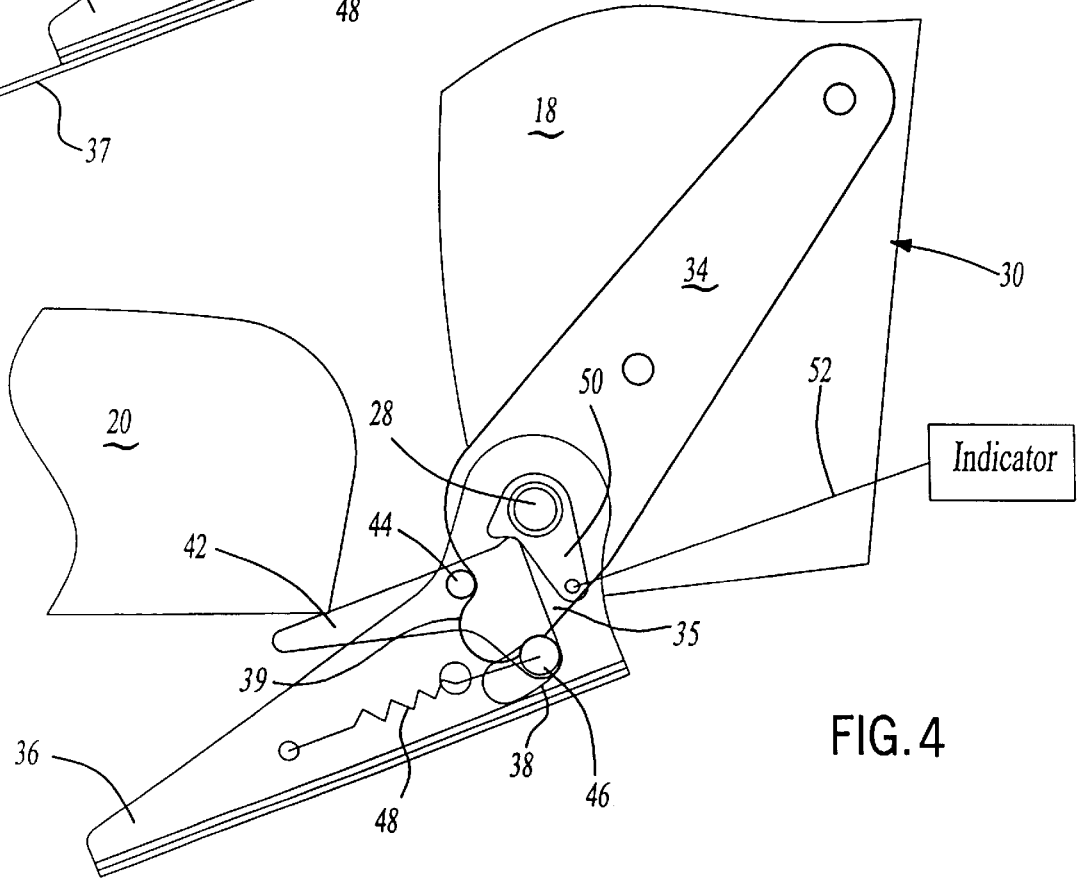
FIG. 4 is an enlarged view of the latch mechanism shown in FIG. 1 according to the preferred embodiment of the present invention shown in a latched position.

FIGS. 3 and 4 are enlarged views of the latch mechanism 30 shown in FIG. 2. FIG. 3 depicts the latch mechanism 30 in an unlatched position and FIG. 4 depicts the latch mechanism 30 in a latched position. The latch mechanism 30 includes a sector support 34 for supporting the seat back 1 8. The sector support 34 is pivotably coupled to a base plate 36 at the pivot point 28. The base plate 36, in the preferred embodiment, is fixed to the floor pan 37 of the vehicle 10. The seat back 18, via the sector support 34, may pivot about the pivot point 28 from a vertical seat forming position to a horizontal storage position. The sector support 34 includes a locking portion 35 on which is formed an outer surface 39 and an engagement surface 38 for engaging a stop, described below, to fix the sector support 34 and thus, the seat back 18 in the seat forming position.

As shown, a lever 42 is pivotally coupled to the base plate 36 at pivot point 44 and includes a stop 46. The lever 42, as it pivots, will move the stop 46 through an arcuate path in and out of a position where the stop can engage the engagement surface 38 so as to latch and unlatch the seat back 18 in a seat forming position. The stop 46 is configured as a cylindrically shaped pin and the engagement surface (profiled surface) 38 includes a camming surface 47 for mating or riding relative to the stop 46. Camming surface 47 is formed to progressively increase the interference between engagement surface 38 and stop 46 as lever 42 forces stop 46 into further engagement. Accordingly, as the lever 42 is pivoted, the stop 46 pivots into contact with the engagement surface 38 of the sector support 34, until the stop 46 engages a recess on the engagement surface 38 where it latches the seat back 18. In alternate embodiments, the engagement surface 38 could be flat or any other shape that is able to couple the stop 46 to the engagement surface.

In operation, the lever 42 is actuated by the seat cushion 20 as the cushion pivots or moves into the use or seat forming position. As the lever 42 is pivoted downward, the stop 46 is pivoted to a position where the stop 46 engages the engagement surface 38 and latches the sector support 34 and, thus, the seat back 18 in the upright or seat forming position. Upon moving the seat cushion 20 to a vertical stowed position, the lever 42 is spring biased in an upward manner by a spring 48 so that the lever 42 pivots upwardly into the space that the seat cushion 20 has vacated. The stop 46 disengages from the engagement surface 38 of the sector support 34 and allows the seat back 18 to be pivoted to a horizontal stored position. This automatic latching and unlatching of the seat back 18 in the seat forming position by the seat cushion 20 acting upon the lever 42 eliminates the step of manually latching or unlatching the seat back 18 in the seat forming position thereby simplifying the operation and manipulation of the seat assembly 12.

In the preferred embodiment, an additional engagement member 50 is pivotally coupled to base 36 about pivot point 28. Member 50 is pivoted by the lever 42 to actuate a cable 52 which is connected to an indicator for indicating whether the seat back 18 has been properly latched in the a seat forming position. Accordingly, when the seat cushion 20 is in the seat forming position, the cable 52 is moved in such a manner by rotation of the engagement member 50 so as to cause the indicator to generate a visual signal that the latch mechanism 30 is engaged.

Figure 5:
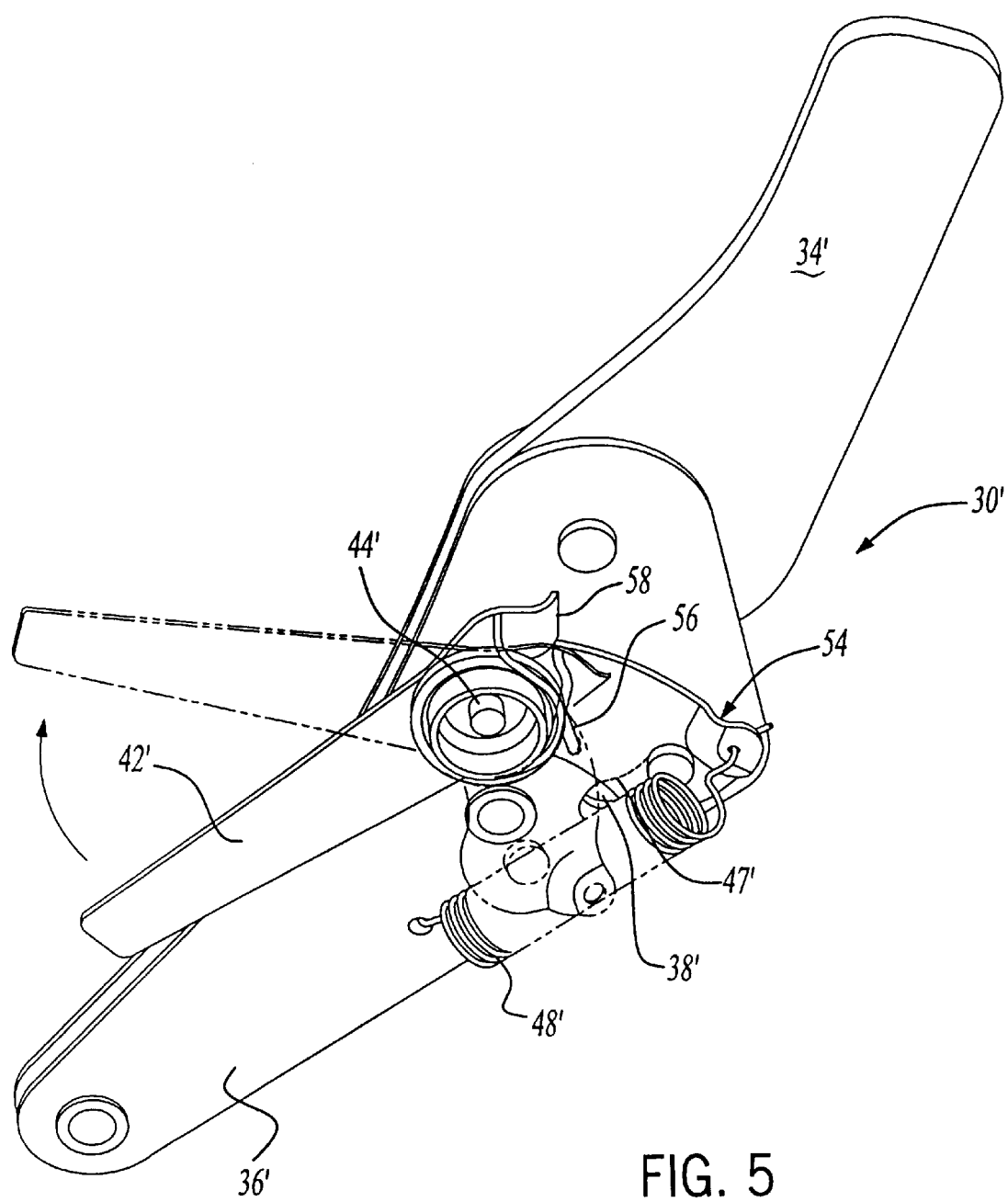
FIG. 5 is a perspective view of an alternate embody of the latch mechanism of the present invention shown in a latched and an unlatched position.

FIG. 5 is a perspective view of an alternate embodiment of a latch mechanism 30' of the present invention shown in the latched and unlatched position (shown in phantom). The latch mechanism 30' is similar to the latch mechanism 30 in that it includes a sector support 34', a base plate 36', an engagement surface 38', a lever 42', a pivot point 44', a camming, surface 47', and a spring 48'. The seat cushion 20 also actuates the lever 42' as in the first embodiment. The lever 42', in this alternate embodiment, will drive a toggle 54 onto the camming surface 47'. Once "looseness" is removed from the latch mechanism 30', the toggle 54 can no longer rotate. The lever 42' then winds up the spring 48' and takes LIP all tolerances in the latch mechanism 30'. As the seat cushion 20 is lifted upward, the release spring 56 disengages the toggle 54 using a member or finger 58. As shown in phantom, the lever 42' moves similarly to the lever 30 of the first embodiment.

It is to be understood that the invention is not limited to the exact construction illustrated and described above, but that various changes and modifications may be made without departing from the spirit and scope of the inventions as defined in the following claims.

We claim:

1. A seat assembly comprising:
    a seat cushion operable to be displaced between a seat forming position and a stowed position;
    a seat back adjacent said seat cushion being separately movable with respect to said seat cushion, said seat back operable to be displaced between a seat forming position and a stowed position; and
    a latch mechanism providing support for said seat back, said latch mechanism comprising:
        a sector support sector member having a locking portion, said locking portion extending from said sector support; and
        a lever, said lever having a movable stop and a fixed stop, said lever being actuated by said seat cushion to cause movement between a locked position in which said locking portion is substantially locked between said movable stop and said fixed stop thereby latching said seat back in the seat forming position and an unlocked position in which said locking portion is not locked between said movable stop and said fixed stop.

2. The seat assembly of claim 1, wherein said seat cushion is attached to a vehicle by a pivot axis.

3. The seat assembly of claim 1, further comprising an integral seat belt being secured to said seat back.

4. The seat assembly of claim 3, wherein said integral seat belt is a three point restraint.

5. The seat assembly of claim 1, wherein said seat assembly is disposed within a vehicle, said seat assembly further comprising a base member coupled to said vehicle and said support member, whereby said seat back is anchored to said vehicle.

6. The seat assembly of claim 1, further comprising an indicator to indicate whether said seat back has been locked into said seat forming position.

7. The seat assembly of claim 1, wherein said latch mechanism further comprises a spring to bias said lever toward its position where said seat cushion is stored.

8. The seat assembly of claim 1, wherein said lever is operated to displace said stop in an arcuate path to engage said locking portion of said support member.

9. The seat assembly of claim 1, wherein said locking portion forms an indentation to mate with said stop.

10. The seat assembly of claim 1, wherein said locking portion is a camming surface.

11. A seat assembly having a separately movable seat cushion and seat back, comprising:

a base member;

support means for supporting said seat back, said support means having an engagement surface and being pivotably coupled to said base member; and a lever pivotably coupled to said base member, said lever having a seat cushion contacting surface and a stop, wherein as said seat cushion is moved from a stored position to a seat forming position, said seat cushion actuates said lever by direct contact with said seat cushion contacting surface of said lever thereby causing said stop to contact said engagement surface of said support means thereby substantially preventing movement of said seat back.

12. The seat assembly of claim 11, wherein said seat cushion is attached to a vehicle by a pivot axis on said seat cushion.

13. The seat assembly of claim 11, wherein said seat back includes an integral seat belt, and said integral seat belt is a three point restraint.

14. The seat assembly of claim 11, further comprising a spring to bias said lever in an upward manner when said seat cushion is in said stored position.

15. A seat assembly having a seat back and seat cushion, said seat assembly comprising:

a base member;

a sector support having an outer surface and a profiled surface, said sector support supporting said seat back and pivotably coupled to said base member; and a lever having a pin and a pivot for pivotable connection to said base member, wherein as said seat cushion is moved to a seat forming position said seat cushion will actuate said lever, said lever placing said pivot substantially into contact with said outer surface and said pin into contact with said profiled surface, thereby locking the seat back into a seat forming position.

16. The seat assembly of claim 15, wherein said seat back includes an integral seat belt, and said integral seat belt is a three point restraint.

17. The seat assembly of claim 15 further comprising a spring to bias said lever toward its position where said cushion is stored.

18. The seat assembly of claim 15, wherein said profiled surface includes an indentation to mate with said pin.

19. The seat assembly of claim 15, wherein said profiled surface includes a camming surface.

20. A method of locking a seat back into a seat forming position comprising:

forming a seat assembly having a seat back, a seat cushion, a base member having a fixed stop, a sector support having an outer surface and a profiled surface, and a lever having a movable stop;

moving said seat cushion from a stowed position to the seat forming position;

actuating said lever with said seat cushion while said seat cushion is being moved to the seat forming position;

causing said movable stop to engage said profiled surface of said sector support and said fixed stop to engage said outer surface of said sector support; and locking said seat back into the seat forming position.

21. A seat assembly comprising:

a seat cushion operable to be displaced between a seat forming position and a stowed position;

a seat back adjacent said seat cushion being separately movable with respect to said seat cushion, said seat back operable to be displaced between a seat forming position and a stowed position;

a latch mechanism providing support for said seat back, said latch mechanism comprising a support member having an engagement surface and a lever having a toggle and a seat cushion contacting surface, wherein said lever is actuated by direct contact between said seat cushion and said contacting surface of said lever to cause said toggle to contact said engagement surface thereby latching said seat back in the seat forming position; and wherein a release spring releases said toggle to unlatch said seat back when said seat cushion deactuates said lever.

22. The seat assembly of claim 1, wherein said release spring disengages said toggle with a release finger.

\* \* \* \* \*